United States Patent [19]

Poirot

[11] Patent Number: 4,473,967
[45] Date of Patent: Oct. 2, 1984

[54] FISH-TRAPPING DEVICE

[76] Inventor: Eugene M. Poirot, Golden City, Mo. 64748

[21] Appl. No.: 373,018

[22] Filed: Apr. 29, 1982

[51] Int. Cl.³ .............................................. A01K 69/00
[52] U.S. Cl. ........................................ 43/100; 43/102; 43/105
[58] Field of Search .................. 43/14, 100, 102, 103, 43/104, 105

[56] References Cited

U.S. PATENT DOCUMENTS

| 124,635 | 3/1872 | Smith | 43/14 |
|---|---|---|---|
| 2,693,161 | 11/1954 | Stubbs | 43/14 X |
| 2,752,722 | 7/1956 | Gardner | 43/61 |
| 3,508,358 | 4/1970 | Lee | 43/60 |
| 3,815,279 | 6/1974 | Poirot | 43/105 X |
| 3,830,004 | 8/1974 | Poirot | 43/14 X |
| 3,905,143 | 9/1975 | Poirot | 43/105 X |
| 4,092,797 | 6/1978 | Azurin | 43/102 |

FOREIGN PATENT DOCUMENTS

171683 10/1965 U.S.S.R. ................. 43/14

Primary Examiner—Nicholas P. Godici
Assistant Examiner—Kurt Rowan
Attorney, Agent, or Firm—Rogers, Eilers & Howell

[57] ABSTRACT

A fish-trapping device has a feed pan therein which initially contains a substantial amount of feed; and that feed performs the dual functions of (a) helping to keep that device in position to enable fish to freely enter it and (b) enticing fish to enter that device. After substantial numbers of fish have entered the fish-trapping device and have eaten sufficient portions of the feed in the feed pan, that device will automatically and silently trap the fish therein.

28 Claims, 12 Drawing Figures

FISH-TRAPPING DEVICE

BACKGROUND OF THE INVENTION

1. Field of the Invention

A fish-trapping device should not trap just one or two fish and, instead, should attract, and then trap, large numbers of fish. Yet, that fish-trapping device should be easy to set, easy to empty, and easy to handle.

2. Prior Art

In my U.S. Pat. No. 3,815,279 for Fishing Net which was granted on June 11, 1974, a very practical and useful fishing net and signalling device are disclosed. A feed pan is placed within that net and is held down by a substantial amount of feed. After substantial numbers of fish have entered that net and have eaten sufficient portions of that feed, that feed pan tilts to cause a switch to close and thereby cause the signalling device to develop a signal. Although that fishing net is extremely practical and usable, it requires the fisherman to raise the net when the signal is developed; and that signal may be developed at various times during the night.

In my U.S. Pat. No. 3,830,004 for Fishing Net which was granted on Aug. 20, 1974, a fishing net is disclosed which has an inflatable tube that normally is largely devoid of air. A feed pan is placed within that net and is held down by a substantial amount of feed. After substantial numbers of fish have entered that net and have eaten sufficient portions of that feed, that feed pan tilts to close a switch and thereby cause a solenoid valve to open to permit compressed gas to enter the inflatable tube and thus cause the top of the net to rise to the surface. Although that fishing net is extremely practical and useful, it requires the fisherman to pull the net close to or onto the land to collect the fish therein.

SUMMARY OF THE INVENTION

The present invention provides a fish-trapping device that has a feed pan therein which can hold a substantial amount of feed; and that feed performs the dual functions of (a) helping to keep that device in position to enable fish to freely enter it and (b) enticing fish to enter that device. After substantial numbers of fish have entered the fish-trapping device and have eaten sufficient portions of the feed in the feed pan, the fish-trapping device will automatically and silently trap the fish therein. Thereafter, that fish-trapping device will surely and safely hold the trapped fish until the fisherman can arrive and empty that device. It is, therefore, an object of the present invention to provide a fish-trapping device which has a feed pan that holds feed so that feed can perform the dual functions of (a) helping to keep that device in position to enable fish to freely enter it and (b) enticing fish to enter that device.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

DETAILED DESCRIPTION OF THE PREFERRED EMBODIMENTS

Figure 1:
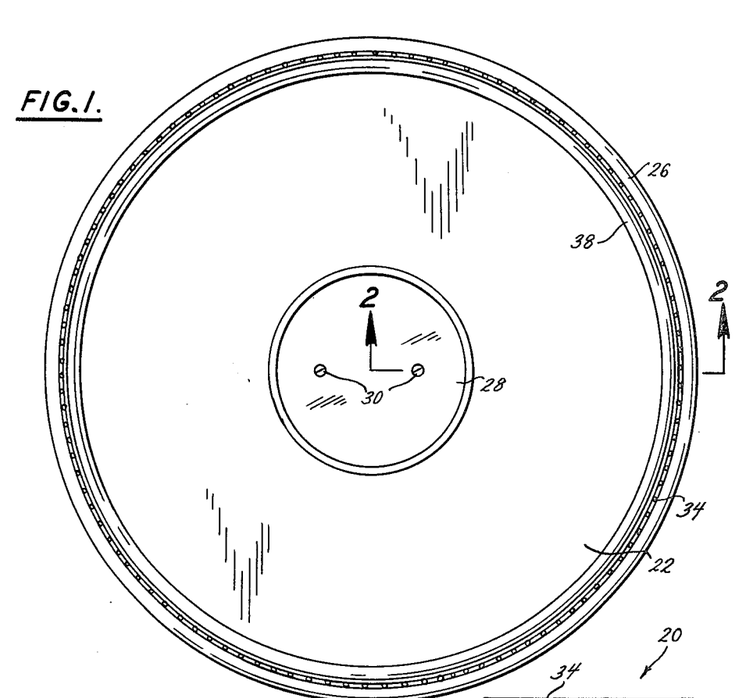
FIG. 1 is a plan view of one preferred embodiment of fish-trapping device which is made in accordance with the principles and teachings of the present invention.
Figure 2:
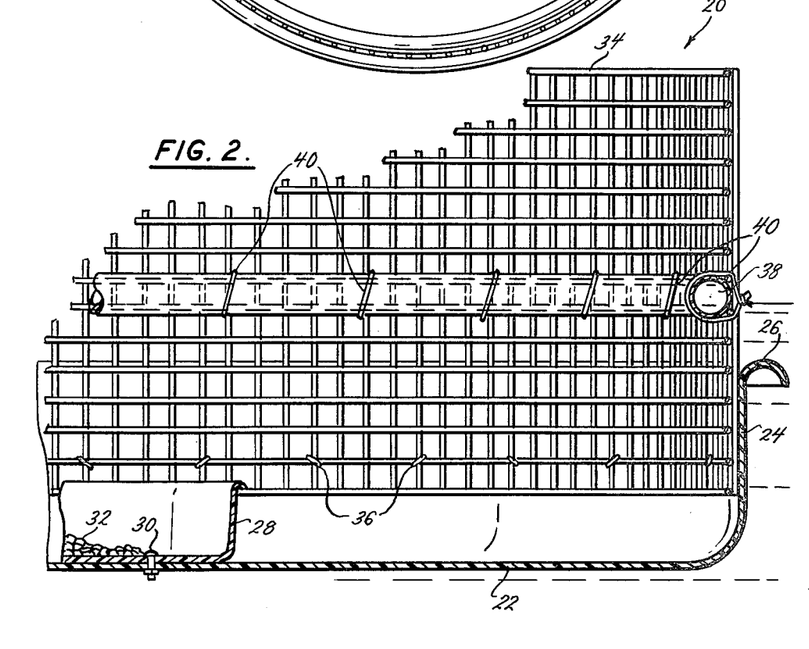
FIG. 2 is a broken sectional view, on a larger scale, of part of the fish-trapping device of FIG. 1, and it is taken along the plane indicated by the line 2—2 in FIG. 1.

Referring particularly to FIGS. 1 and 2, the numeral 20 generally denotes a first preferred embodiment of fish-trapping device which is made in accordance with the principles and teachings of the present invention. That device has a bottom 22 which is circular in plan and which has an upstanding side 24 that is equipped with an outwardly and downwardly bent flange 26. The numeral 28 denotes a feed pan which has a planar bottom, an upstanding side, and an outwardly and downwardly bent flange at the upper edge of that side. Fasteners 30, which are shown as bolts, extend downwardly through aligned openings in the planar portion of feed pan 28 and in the bottom 22; and nuts are threaded onto the lower ends of those bolts to hold that feed pan and bottom in assembled relation. A small amount of feed 32 is shown within the pan 28 but that pan is large enough to hold sufficient feed to attract large numbers of fish.

The bottom 22 is shown as being imperforate and as being made of plastic material; because imperforate containers, which can be used as the bottom 22, are on the market and hence are readily available. One such imperforate plastic container is a child's wading pool which is forty (40) inches in diameter. The feed pan 28 is shown as having the configuration of FIGS. 1 and 2 because plastic pans of that configuration are on the market and hence are available. If desired, however, the bottom 22 could be made of a different configuration or of a different size, and it should be made perforate in nature. Similarly, the feed pan 28 could be made of a different configuration or of a different size. The feed pan 28 preferably is imperforate; and the bottom 22 preferably is made stiff enough to provide a large portion of the strength for the fish-trapping device 20.

The numeral 34 denotes a screen which defines a perforate cylindrical wall for the fish-trapping device 20. That screen can be made from plastic or metal as desired, but it must have openings therein which are large enough to permit small fish to escape from the fish-trapping device 20. Connectors 36, which can be loops of wire or cord or can be staples or other inexpensive connectors, encircle portions of the screen 34 and pass through openings, not shown, in the upstanding side 24 of the bottom 22. Those connectors fixedly secure that screen to that bottom. As shown particularly by FIG. 2, the lower portion of the screen 34 is telescoped downwardly within the upstanding wall 24 of the bottom 22; and the engagement between that lower portion and that upstanding side wall will aid the connectors 36 in holding that screen fixed relative to that bottom.

The numeral 38 denotes a flotation tube which is disposed at the inner surface of the screen 34. Connectors 40, which are shown as short lengths of wire or cord, extend around that tube and through openings in that screen and then are twisted or tied. Those connectors fixedly hold the flotation tube 38 at a level which is intermediate the top and bottom of the screen 34. That flotation tube can be a light-weight hollow hoop, or it can be an inflatable tube with an inflating fitting, not shown, of the type used for bicycle tires, inner tubes or tubeless tires. Where that flotation tube is a light-weight, hollow hoop, it will confine a fixed quantity of air therein, and the buoyancy of the fish-trapping device 20 will be adjusted by placing weights in the bottom 22. Where that flotation tube is an inflatable tube, the buoyancy of that fish-trapping device will be adjusted by admitting desired amounts of air into that flotation tube.

In determining the buoyancy of the fish-trapping device 20, that device should be placed in a body of water which is deep enough to permit all of that device to be submerged. Thereupon, sufficient weights should be placed in the bottom 22, or sufficient air should be introduced into that flotation tube—through the hose of an air-supplying device which was previously attached to the air fitting of that flotation tube—to render the fish-trapping device 20 buoyant when the feed pan 28 is empty. One air-supplying device which could be used as a cylinder of compressed gas, and another is a piston-plunger air pump of the type used to inflat bicycle tires, inner tubes or tubeless tires.

In one preferred embodiment of the present invention, the flotation tube 38 has a one-inch diameter and is located four (4) inches above the level of the flange 26 at the upper edge of wall 24 of bottom 22; and the upper edge of the screen 34 is located twelve (12) inches above that upper edge. Such an arrangement enables water to flow into the device 20 and thereby supply oxygen to the fish trapped therein, even when the flotation tube 38 is at the level of the surface 42 of the body of water. Also, such an arrangement enables small fish to escape through the portion of screen 14 which is between the flotation tube 38 and the edge 26; and the upper portion of that screen will keep the large fish from jumping out of the device 20. Where shrimp or crayfish or the like are to be trapped by the device 20, the upper edge of screen 34 should be provided with a shield-like extension which inclines downwardly and inwardly at an angle of forty-five degrees (45°). Such an extension will permit fish, shrimp, crayfish and the like to enter the top of the device 20 whenever that top is below the surface 42, but will largely keep fish, shrimp, crayfish and the like from escaping from that device after the flotation tube 38 rises to that surface. To minimize shipping space and costs, the fish-trapping device 20 preferably is shipped "knocked-down" and then is assembled by the retailer or by the fisherman.

To use the fish-trapping device 20, sufficient feed 32 should be placed in the feed pan 28 to (a) overcome the buoyancy of the air in the flotation tube 38 and (b) attract large numbers of fish. Thereupon, that fish-trapping device should be pushed or pulled to a desired location in a body of water, and then permitted to come to rest on the bottom of that body of water. At such time, the top of the screen 34 should be far enough below the surface 42 of the body of water to enable fish to freely swim over that top and then move downwardly to eat the feed 32.

The fish-trapping device 20 will remain on the bottom of the body of water until a substantial number of fish have swum over the top of the screen 34 and have moved downwardly to eat the feed 32. After a sufficient portion of that feed has been eaten, that fish-trapping device will respond to the air within the flotation tube 38 to start moving upwardly. That movement will be completely noiseless, and it will be so slow and so gradual that it will not be perceived by the fish. As a result, the fish will continue to eat the feed 32 and the fish-trapping device 20 will continue to rise upwardly until the flotation device 38 reaches the surface 42. When all of the feed 32 has been eaten, the fish will realize that they are confined; but, at such time, the upper portion of the screen 34 will extend far enough above the surface 42 to keep the fish from jumping over that screen. As a result, fish of the desired size will be held against escape. Small fish will, however, escape through the interstices of that portion of screen 34 which is intermediate the flotation tube 38 and the edge 26 of wall 24; and hence the fisherman will not have to separate small fish from fish of the desired size. All of the trapped fish will be able to obtain oxygen from water which flows through the portion of screen 34 which is intermediate the flotation tube 38 and the edge 26 of wall 24, and hence will remain alive and in good condition, even though held within the fish-trapping device 20 for many hours.

A tether, not shown, will have one end thereof attached to the fish-trapping device 20; and the other end of that tether will be attached to a peg, post or other stationary object on the shore. As long as that fish-trapping device is resting on the bottom of the body of water, it will remain in a fixed position. However, when that fish-trapping device rises to the surface 42, in response to the eating of a substantial portion of the feed 32 in the feed pan 28, that device can respond to wind to tend to move along that surface. However, the tether will limit the distance through which the fish-trapping device 20 can move in response to wind; and it will enable the fisherman to pull that device close enough to the shore to empty that device. Once that device has been emptied of fish, further feed 32 can be placed in the feed pan 28, and that device can again be pushed or pulled to a desired location within the body of water. The fish-trapping device 20 has caught as much as one hundred (100) pounds of fish with one quantity of feed 32; and catches should average fifty pounds or more.

The feed pan 28 is useful and desirable; but it is not absolutely essential. If desired, that feed pan could be eliminated, and the feed 32 could be placed directly on the bottom 22 of the fish-trapping device 20.

Figure 3:
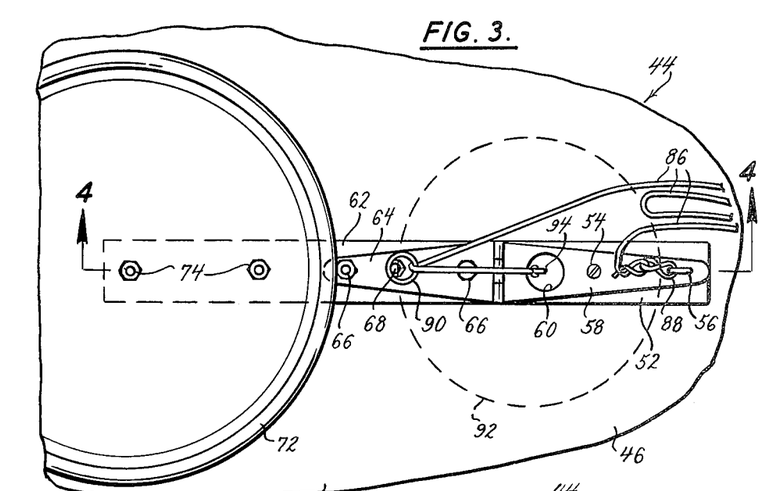
FIG. 3 is a plan view of a portion of a second preferred embodiment of fish-trapping device which is made in accordance with the principles and teachings of the present invention.
Figure 4:
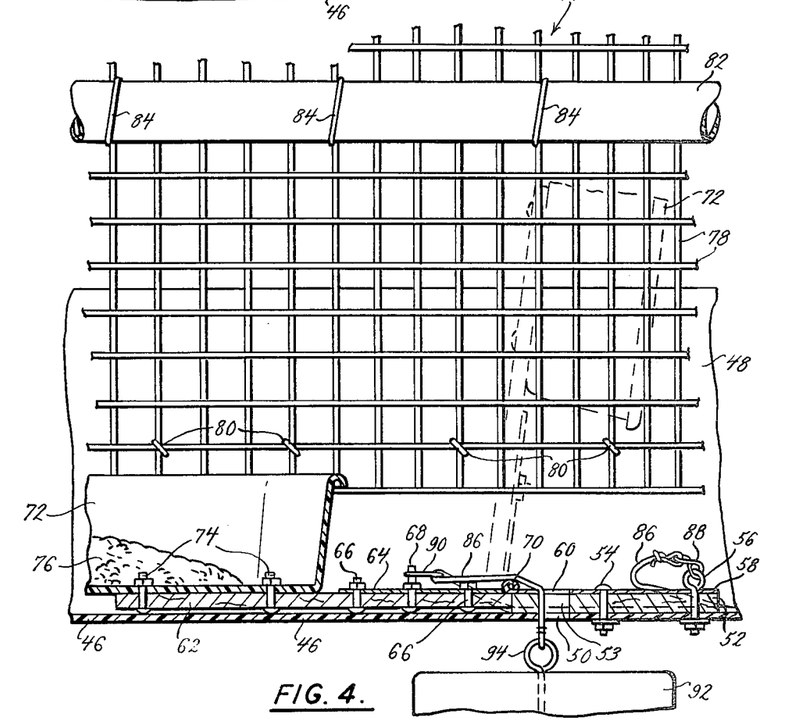
FIG. 4 is a sectional view which is taken along the plane indicated by the line 4—4 in FIG. 3.

Referring particularly to FIGS. 3 and 4, the numeral 44 generally denotes a second preferred embodiment of fish-trapping device which is made in accordance with the principles and teachings of the present invention. A bottom 46 with an upstanding side 48 can, and preferably will, be essentially identical to the bottom 22 and upstanding side 24 of the fish-trapping device 20. However, the bottom 46 differs from the bottom 22 in having a circular opening 50 therein as shown by FIG. 4. A short board 52 has a circular opening 53 therein which has the same diameter as the opening 50; and the openings 53 and 50 are in vertical registry with each other. A hinge plate 58 has an opening 60 therein which has the same diameter as opening 50; and that hinge plate overlies the board 52 and has its opening 60 in register with the openings 50 and 53. A screw 54 and an eyebolt 56 extend through that hinge plate, the board 52 and the bottom 46 to hold that hinge plate and board fixed relative to that bottom. Washers and nuts hold the screw 54 and the eyebolt 56 against accidental separation from hinge plate 58, board 52 and bottom 46.

The numeral 62 denotes a longer, but thinner, board which is disposed in end-to-end relation to the board 52. A hinge plate 64 is secured to the right-hand end of board 62 by bolts 66 and by an elongated bolt 68, and by nuts which are threaded onto the projecting ends of those bolts. As shown particularly by FIG. 4, the upper end of bolt 68 projects an appreciable distance above the level of the upper ends of the bolts 66. After the bolt 68 has been solidly secured to board 62 and hinge plate 64, the threads on the exposed end of that bolt will be rendered smooth by filing or by filling them with a cement or other material. As a result, the projecting end of the bolt 68 will be smooth.

A hinge pin 70 holds the hinge plates 58 and 64 in assembled relation while permitting ready rotation of hinge plate 64 relative to hinge plate 58. The numeral 72 denotes a feed pan which can be identical to the feed pan 28 of the fish-trapping device 20. Bolts 74 and nuts therefor secure that feed pan to the left-hand end of the board 62. The numeral 76 denotes a small amount of feed within that feed pan; but that feed pan can hold considerably larger amounts of feed. The board 62 will be rendered resistant to water-logging by being impregnated with paraffin or with a light-weight plastic impregnant. As a result, that board will be buoyant despite prolonged submersion in water. The pan 72 is light in weight, and it is very buoyant. Also that pan is made of plastic so it will retain its buoyancy regardless of how long it remains immersed in water.

The numeral 78 denotes a screen which can, and preferably will, be identical to the screen 34 of the fish-trapping device 20. Connectors 80, which can be identical to the connectors 36 of the fish-trapping device 20, are used to fixedly secure the lower portion of the screen 78 within, and in abutting engagement with the inner surface of, the upstanding side 48. The numeral 82 denotes a flotation tube which is larger than the flotation tube 38 of the fish-trapping device 20—having a diameter larger than one inch. Connectors 84, which can be identical to the connectors 40, fixedly secure that flotation tube to the screen 78. The upper edge of the screen 78 will be spaced upwardly above the level of the flotation tube 82 in the same manner in which the upper edge of the screen 34 is spaced above the level of the flotation tube 38.

The numeral 86 denotes a tether, which can be a rope, chain, wire or other elongated flexible element, that has one end thereof secured to the eyebolt 56 by an S-hook 88. A loop 90 is fixed to a selected point along the length of that tether, as by opening that loop, passing it through the fibers or a link of that tether, and then re-closing that loop. That loop is large enough to telescope freely over the projecting upper end of the elongated bolt 68, but is small enough to pass freely through the openings 60, 53 and 50, respectively, in hinge plate 58, board 52 and bottom 46. A further portion of the tether 86 extends from the loop 90, passes over the cylindrical portions of the hinge plates 58 and 64, passes downwardly through the openings 60, 53 and 50, and is secured to an eye 94 of a weight 92. If desired, a couple of bricks or a stone could be used in lieu of the weight 92; and, in such event, the tether 86 would be secured to those bricks or that stone by a barrel hitch or other suitable knot or would be secured to a rope, chain or wire which was solidly secured to those bricks or that stone.

The portion of the tether 86, which is between the loop 90 and the weight 92, is shown as being short enough to hold that weight close to the bottom 46 of the fish-trapping device 44. Such an arrangement will be used whenever that fish-trapping device is to be used in shallow water. However, the portion of tether 86, which is between the loop 90 and the weight 92, can be made of whatever length is needed to dispose that weight the desired distance below the bottom 46. Where that is done, the weight 92 will sink to the bottom of the body of water; and the fish-trapping device 44 will respond to the air in the flotation tube 82 to rise upwardly until further upward movement is prevented by the tether 86. The opening 50 preferably will be aligned with, or close to, the center of buoyancy of the fish-trapping device 44.

The flotation tube 82 will be dimensioned to provide enough air to make the fish-trapping device 44 buoyant, even if the feed pan 72 were to be completely filled with feed 76. As a result, that fish-trapping device will tend to float at all times; and it will remain submerged only as long as the weight 92, the tether 86, and the loop 90 hold it submerged.

To use the fish-trapping device 44, sufficient feed 76 will be introduced into the feed pan 72 to cause that feed pan to hold the elongated board 62 against the bottom 46. The tether 86 will be used to pull the weight 92 far enough upwardly, relative to the bottom 46, to permit the loop 90 to pass upwardly through the openings 50, 53 and 60, respectively, in that bottom, in the board 52, and in the hinge plate 58. That loop will then be telescoped over the upper end of the elongated bolt 68; and the portion of tether 86, which is intermediate loop 90 and S-hook 88, will be laid out on the bottom 46 so it will not tangle or snarl as it is pulled toward and through the openings 60, 53 and 50 when that loop is freed from the upper end of that elongated bolt. Thereafter, the fish-trapping device 44 will be pushed or towed to a desired location in a body of water, and then permitted to sink downwardly until the weight 92 rests on the bottom of that body of water. At that time, the upper edge of the screen 78 will be far enough below the surface of that body of water to permit fish to swim over that edge, and then move downwardly to the feed 76 in the feed pan 72. That feed will perform the dual functions of holding the feed pan 72 adjacent the bottom 46 and of enticing fish to swim over the upper edge of the screen 78.

When a substantial number of fish have swum over that upper edge and have eaten a sufficient portion of the feed 76, the buoyance of the feed pan 72 and of the elongated board 62 will cause the free end of that board to move upwardly toward the dotted-line position of FIG. 4. As that free end moves upwardly out of the solid-line position of FIG. 4, the horizontally-directed force, which the portion of tether 86 that is intermediate loop 90 and weight 92 normally applies to that loop, will become a force that inclines downwardly and to the right. As the free end of the elongated board 62 reaches a position where that board coacts with the bottom 46 to subtend an angle of about forty-five (45) degrees, the loop 90 will slip off of the free end of the elongated bolt 68; and the fish-trapping device 44 will start moving upwardly toward the surface. The loop 90 will pass toward and through the openings 60, 53 and 50; and the portion of tether 86, between loop 90 and S-hook 88, will then pass to and through those openings to permit device 44 to rise to the surface of the body of water. When that device reaches that surface, the flotation tube 82 will occupy a position which is essentially identical to the position occupied by the flotation tube 38 in FIG. 2. The upper edge of the screen 78 will extend about eight (8) inches above the flotation tube 82, and hence will keep any fish from jumping over that edge.

The upward movement of the free end of the elongated board 62 will be completely noiseless, and it will be so slow and gradual that the fish will not be alarmed by the change in the position of the feed pan 72 or of the feed 76 therein. As a result, the fish will continue to eat that feed, and hence will continue to remain within the fish-trapping device 44. After the loop 90 slips off of the free end of the elongated bolt 68, that device will start moving upwardly. The rate at which that device rises toward the surface will be slow enough so it will not alarm the fish. As a result, the fish will continue to eat the feed 76, and hence will continue to remain within the fish-trapping device 44.

Referring particularly to FIGS. 5-8, the numeral 98 generally denotes a third preferred embodiment of fish-trapping device which is made in accordance with the principles and teachings of the present invention. That device has an open-type generally-rectangular lower frame 100 and a similar upper frame 102. Although those frames could be made in different ways and from different materials, they are preferably made from plastic or metal tubes or rods which are stiff and which can be bent to a given configuration and will thereafter retain that configuration. The numerals 104, 106, 108 and 112 denote, respectively, the screen-like bottom, sides and rear of the fish-trapping device 98. The front of that device normally is open. That bottom, those sides and that rear preferably are made from mesh, screen or a thin, molded plastic, screen-like sheet. Connectors 114 secure the upper edges of the sides 106 and 108 and of the rear 112 to the frame 102. Connectors 116 secure the bottoms of those sides and of that rear to the frame 100 and also to the edges of the bottom 104. Further connectors 116 connect the front edges of the sides 106 and 108 to vertically-disposed spacers 110; and still further connectors 116 connect the front edge of the bottom 104 to the front of frame 100. The connectors 114 and 116 can be short lengths of wire, cord or other securing material.

Where the sides 106 and 108 and the rear 112 are made of mesh, the fish-trapping device 98 can be packaged and shipped in a collapsed state, and hence can be shipped compactly and economically. The vertical spacers 110, plus similar spacers at the rear of that device, would hold the frame 102 spaced above the level of the frame 100 whenever that device was to be used. Where the sides 106 and 108 and the rear 112 are made of screen, the vertical spacers might not be needed at the rear of the device; because the screen sides and rear could be stiff enough to hold the frame 102 spaced above the level of the frame 100. In the latter event, the frames 102 and 100 would coact with the bottom 104, with the sides 106 and 108, and with the rear 112 to constitute a light-weight but rugged, perforate, open-type enclosure.

The numeral 118 denotes a closure which is made from screen and which has a downwardly-directed peripheral flange 120 at the front and side edges thereof. That flange is deep enough and wide enough to effectively close the front of the device 98 whenever that closure is in the closed position indicated by the numeral 111 in FIG. 6. A reinforcing rod 122 extends diagonally between two of the corners of the closure 118, and a reinforcing rod 124 extends diagonally between the other two corners of that closure. Those reinforcing rods are secured to the upper surface of the closure 118 by connectors 126. The side edges of the front of the downwardly-directed peripheral flange 120 are connected to the front edges of the downwardly-extending sides of that peripheral flange. As a result, the closure 118 is a perforate open-bottomed closure. That closure is dimensioned to fit closely within the space which is defined by the upper frame 102; and hence, whenever that closure is in the closed position indicated by the numeral 111 in FIG. 6, it will keep fish from rising upwardly over the tops of sides 106 and 108 and of rear 112 of the device 98, and also will keep fish from escaping through the front of that device. A short plate 161, with an opening in the rear thereof, is secured to the approximate midpoint of the front edge of the closure 118, as indicated particularly by FIG. 5. That plate will rest upon the upper surface of the upper frame 102 whenever that closure is in the closed position indicated by the numeral 111 in FIG. 6; and it will keep that closure from moving downwardly too far into the open top enclosure which is defined by the sides 106, 108 and the rear 112.

Figures 5, 7, 8, 12:
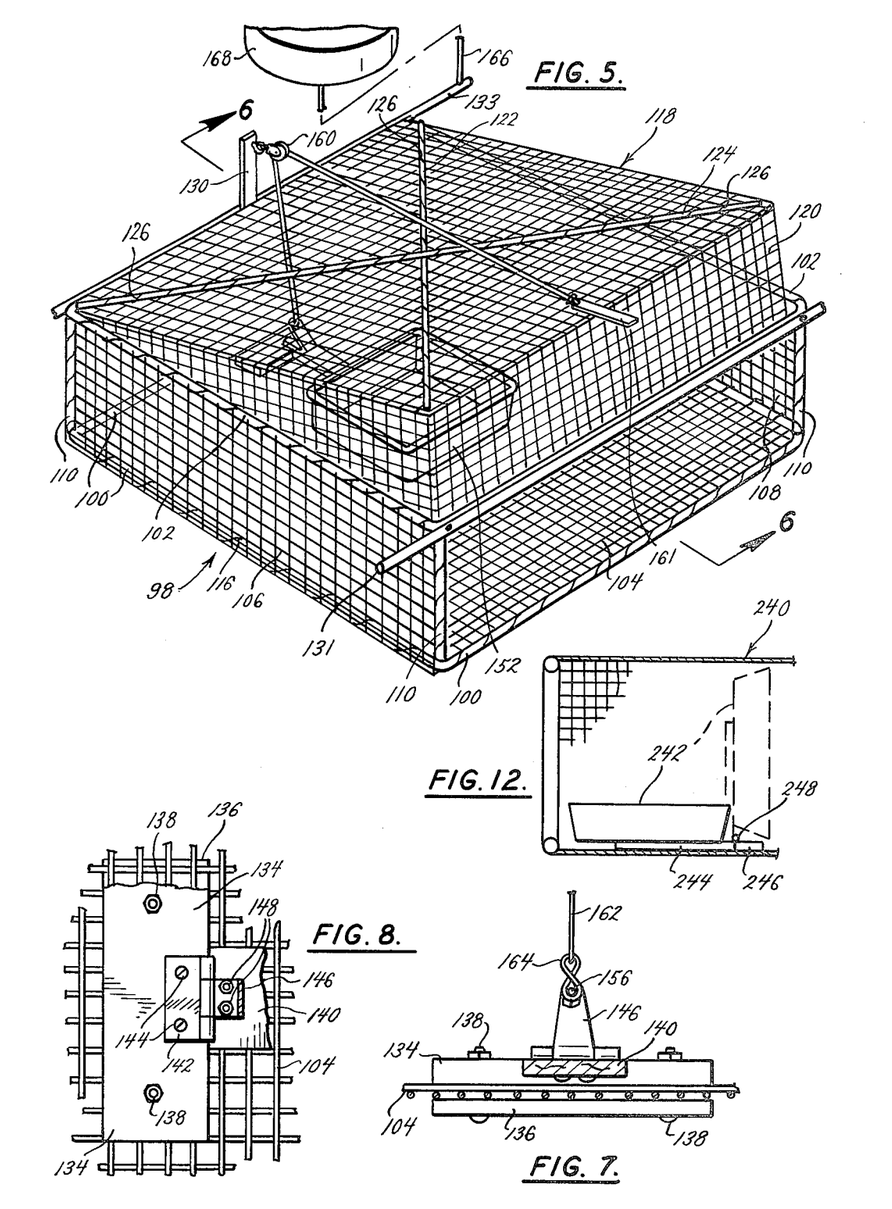
FIG. 5 is a perspective view of a third preferred embodiment of fish-trapping device which is made in accordance with the principles and teachings of the present invention.
FIG. 7 is a sectional view, on a scale larger than those of FIGS. 5 and 6, which is taken along the plane indicated by the line 7—7 in FIG. 6.
FIG. 8 is a sectional view, on the scale of FIG. 7, and it is taken along the plane indicated by the line 8—8 in FIG. 6.
FIG. 12 is a sectional view of the entrance of a fifth preferred embodiment of fish-trapping device which is made in accordance with the principles and teachings of the present invention.
Figure 6:
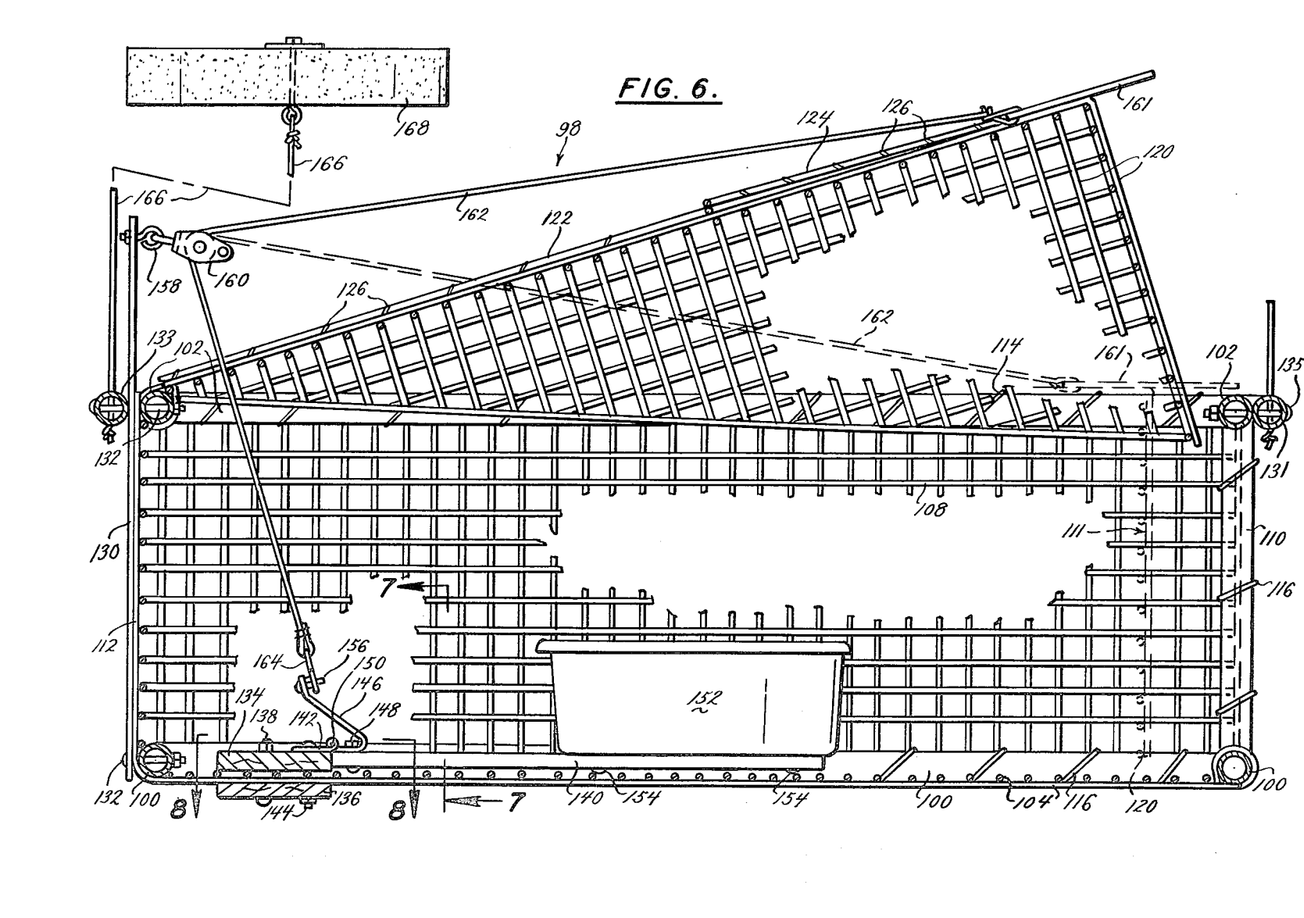
FIG. 6 is a vertical section, on a larger scale, through the fish-trapping device of FIG. 5.

The numeral 130 denotes a stiff bar which is fixedly secured to the rear of frame 100 and to the rear of frame 102 by bolts 132. Where the sides 106 and 108 and the rear 112 are made of mesh, and where the fish-trapping device 98 is to be shipped in a collapsed state, the bar 130 will initially be separated from frame 100 or frame 102 and laid parallel to the rear edge of the other frame. That bar will subsequently be connected by the dealer or the fisherman to the frame from which it was initially separated.

The numeral 131 denotes a tube which is secured to the front of frame 102 by bolts 135. The numeral 133 denotes a tube which is secured to the rear of that frame by the bolts 132. Those tubes are longer than that frame; and the ends of those tubes preferably project about a foot beyond each end of the fish-trapping device 98. Cords 166 of equal lengths are secured to the outer ends of the tubes 131 and 135 and extend to floats 168. Those cords and floats will suspend the device 98 at a selected distance below the surface of a body of water.

The bolts 132, which are adjacent the ends of the frame 102, extend through the tube 133 and through that frame and are held by nuts. The bolt 132 which is adjacent the bar 130, extends through the tube 133, through that bar, and through the frame 102 and is held by a nut. The upper end of that bar extends an appreciable distance above the frame 102 of the device 98. The bolts 135 extend through the tube 131 and through the frame 102 and are held by nuts.

The numeral 134 denotes a short board which overlies part of the bottom 104; and the numeral 136 denotes a further short board which underlies and is in register with the board 134. Bolts 138 and the nuts therefor fixedly secure those boards to that bottom. The numeral 140 denotes an elongated board which is rendered resistant to water-logging by paraffin or a suitable plastic impregnant. One end of that board is held immediately adjacent the midpoint of the board 134 by a hinge. A plate 142 of that hinge is secured to the boards 134 and 136 by bolts 144 and the nuts therefor. An elongated plate 146 of that hinge is secured to the left-hand end of the elongated board 140 by bolts 148; and the free end of that plate is bent to subtend an angle of about forty-five (45) degrees. The tip of that free end is bent upwardly and forwardly about thirty (30) degrees. A hinge pin 150 holds the hinge plates 142 and 146 in assembled relation.

A feed pan 152, which can, and preferably will, be identical to the feed pan 28 of the fish-trapping device 20, is secured adjacent the free end of the elongated board 140 by bolts 154 and the nuts therefor. That feed pan is buoyant; and it will, whenever the fish-trapping device 98 is submerged in water, coact with the elongated board 140 to tend to cause that free end to rotate upwardly about the hinge pin 150. However, the buoyancy of that feed pan and of that elongated board can, as desired, be overcome by the placing of sufficient feed within that feed pan.

The numeral 156 denotes an elongated bolt which extends through an opening in the upwardly and forwardly-bent tip of the free end of the hinge plate 146; and a nut fixedly secures that screw to that tip. After that bolt has been solidly secured to that tip, the threads on the underportion and sides of the exposed end of that bolt will be rendered smooth by filing or by filling them with a cement or other material. As a result, the lower portion and sides of the projecting end of the bolt 156 will be smooth.

One preferred form of the embodiment of fish-trapping device 98 is four feet long, four feet wide, and one and one-half feet high. Such an embodiment has caught as much as one hundred (8100) pounds of fish with one quantity of feed, and catches should average fifty (50) pounds or more.

The numeral 158 denotes an eyebolt which is fixedly secured within an opening in the upper end of the bar 130 by a nut. A pulley 160 is secured to the eyebolt 158 so it cannot be accidentally separated from that eyebolt but can move relative to that eyebolt. A tether 162, which can be a rope, cord, chain or wire, has one end thereof fixed to the opening in the plate 161; and it passes through the pulley 160 and has an S-shaped hook 164 secured to the other end thereof. The portion of that tether, which is intermediate pulley 160 and S-shaped hook 164, is passed through one of the openings in the top of closure 118. That tether is made short enough so it will hold that closure open whenever that S-shaped hook is telescoped over the projecting end of the bolt 156, as shown in FIGS. 6 and 7. At such time, the rear portion of the periphery of the rotor of the pulley 160, the S-shaped hook 164 and the hinge pin 150 will define an essentially-straight line. This is desirable; because it makes certain that the force, which the weight of the closure 118 applies to the portion of the tether 162, intermediate hook 164 and pulley 160, does not develop a moment arm which could tend to raise or lower the free end of the elongated board 140.

To use the fish-trapping device 98, feed will be placed within the feed pan 152, and that feed pan will be permitted to move downwardly into engagement with, or immediately adjacent to, the bottom 104. Thereupon, the closure 118 will be moved to the approximate position shown by FIG. 5; and the hook 164 will be telescoped over the projecting end of the bolt 156. Thereafter, the weight of that closure will be permitted to tension the tether 162; and the reaction force within that tether will hold that closure in the position of FIG. 5.

At such time, the fish-trapping device 98 can be pushed or pulled to a desired location in a body of water, and then permitted to sink down below the surface of that body of water. The floats 168 are connected to the ends of tubes 131 and 133 by the cords 166. Those floats will be at the surface of the body of water, but those cords will let that fish-trapping device sink down into that body of water.

The closure 118 will remain "open", and will thereby permit fish to swim inwardly through the open front to the feed within the feed pan 152. After a substantial number of fish have entered that device and have eaten a sufficient amount of that feed, the buoyancy of the feed pan 152 and of the board 140 will cause that feed pan and the free end of that board to start moving upwardly. That movement will be completely noiseless, and it will be so slow and so gradual that it will not be perceived by the fish. As a result, the fish will continue to eat the feed. Before the feed pan 152 and the free end of the board 140 have moved upwardly forty-five degrees, the hook 164 will slip off of the projecting end of the bolt 156, and will thereby permit the closure 118 to move to the closed position which is indicated by numeral 111 in FIG. 6. At such time, that closure will entrap the fish within the device 98.

The perforate nature of the sides, rear, bottom and closure of that fish-trapping device will permit oxygen-bearing water to reach the fish; and that water will keep them alive and in good condition. A further tether, not shown, could be used to draw that fish-trapping device toward the shore, where it could be beached or could be emptied by a fisherman standing in shallow water. If desired, of course, the fish-trapping device 98 could be left away from the shore; and the fisherman could use a boat to empty it, and then re-set it. By making the cords 166 of different lengths, it is possible to hold the fish-trapping device 98 at various desired distances below the surface of the body of water.

If desired, the fish-trapping device of FIGS. 1 and 2 could be made so the bottom 22 thereof was made of screen, in the same manner in which the bottom of the fish-trapping device 98 of FIGS. 5-8 is made of screen. Similarly, if desired, the bottom of the fish-trapping device 44 of FIGS. 3 and 4 could be made of screen, in the same manner in which the bottom of the fish-trapping device 98 of FIGS. 5-8 is made of screen. Where that is done frames, which would be comparable to the frames 100 and 102 of the fish-trapping device 98, would have to be provided. The use of such frames would permit the fish-trapping devices 20 and 44 to have the circular configuration of FIGS. 1–4, the rectangular configurations of the fish-trapping device 98, or any other desired configuration.

Figures 9, 10, 11:
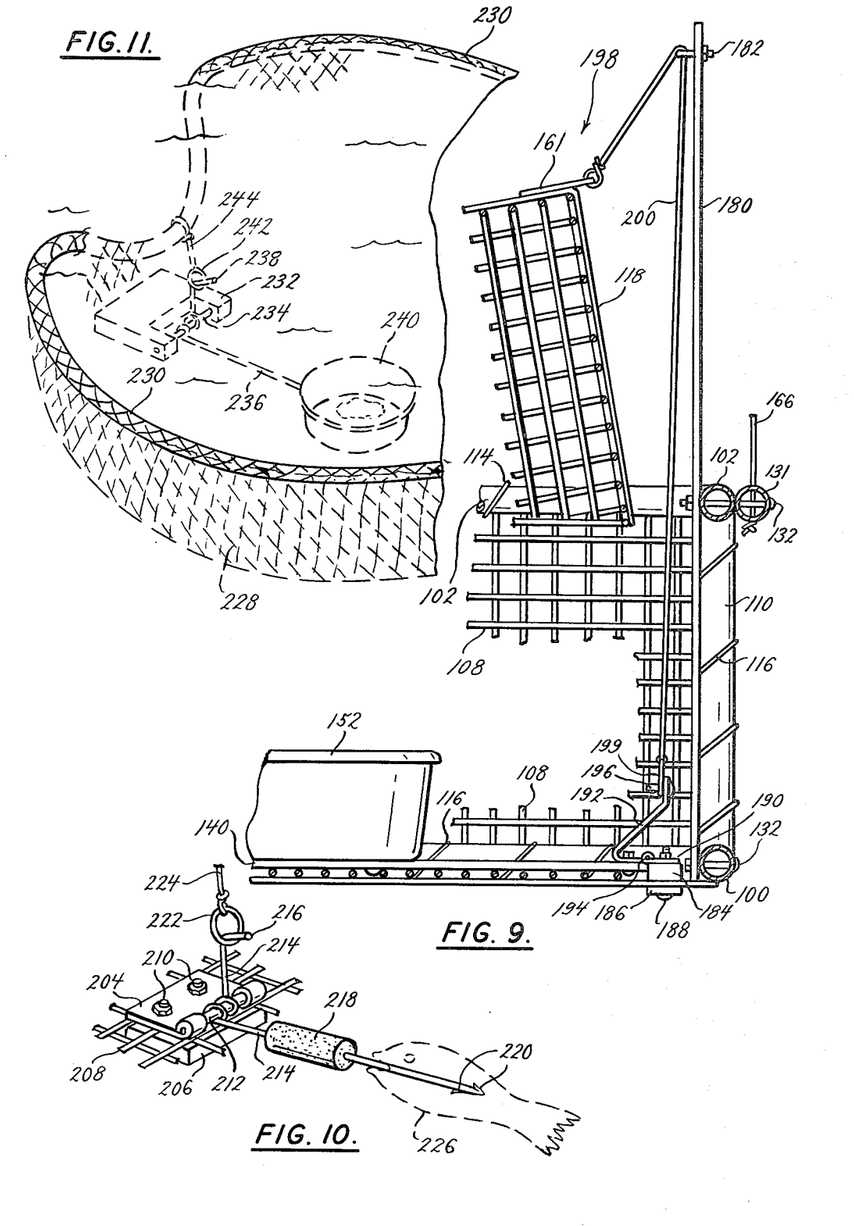
FIG. 9 is a vertical section through part of a fourth preferred embodiment of fish-trapping device which is made in accordance with the principles and teachings of the present invention.
FIG. 10 is a perspective view of a simple form of tether-holding and tether-releasing mechanism for a fish-trapping device.
FIG. 11 is a perspective view of part of a net which has one edge thereof normally held down by a tether-holding and tether-releasing mechanism.

Referring particularly to FIG. 9, the numeral 198 generally denotes a fish-trapping device which is very similar to the fish-trapping device 98 of FIGS. 5–8. The fish-trapping device 198 has a lower frame 100, an upper frame 102 and spacers 110 which preferably are identical to the similarly-numbered frames and spacers of the fish-trapping device 98. The bottom, sides, rear, open front and closure for the fish-trapping device 198 preferably are idential to the bottom, sides, rear, open front and closure for the fish-trapping device 98; and FIG. 9 shows portions of the bottom 104, of the side 108, and of the closure 118 for the fish-trapping device 198. Fig. 9 also shows connectors 114 and 116, elongated tube 131, bolts 132, plate 161 and a cord 166 which preferably are identical to the similarly-numbered elements in FIGS. 5–8.

The fish-trapping device 198 preferably differs from the fish-trapping device 98 only in the location of the tether-holding and tether-releasing mechanisms of those fish-trapping devices. Specifically the fish-trapping device 198 has the tether-holding and tether-relasing mechanism thereof adjacent the open front thereof, whereas the fish-trapping device 98 has the tether-holding and tether-releasing mechanism thereof adjacent the rear thereof. The tether-holding and tether-releasing mechanism for the fish-trapping device 198 includes an elongated vertically-directed bar 180 which is secured to the lower and upper frames 100 and 102, respectively, by bolts 132. Although that bar will span, it will not block, the open front of the fish-trapping device 198. An eye-bolt 182 is secured to the upper end of that bar with the "eye" thereof facing toward the closure 118. If desired, the upper end of the bar 180 could be bent into the form of a loop to obviate the need for an eye-bolt.

The numeral 184 denotes a board which overlies part of the bottom 104, and the numeral 186 denotes a board which underlies that bottom; and bolts 188 extend through those boards and a hinge plate 190 to fixedly secure those boards and that hinge plate to that bottom. A hinge plate 192 is secured to the hinge plate 190 by a hinge pin 194; and a board 140 is secured to the lower part of hinge plate 192 by bolts. That board and the bolts therefor preferably are identical to the board 140 and the bolts 144 of FIGS. 6–8. A feed pan 152 is secured to the free end of the board 140; and that pan preferably is identical to the feed pan 152 of FIGS. 5 and 6. The hinge plate 192 has the free end thereof bent upwardly and to the right in FIG. 9; and then has the upper portion thereof bent upwardly. As a result, that hinge plate closely resembles the hinge plate 146 of FIGS. 6–8. An elongated bolt 196 has the shank thereof extending through the upper end of hinge plate 192; and the under surface and sides of that shank are made smooth by grinding or filling. The numeral 199 denotes an S-hook at the lower end of a tether 200 which extends upwardly through the eye-bolt 182 and then downwardly to the plate 161 at the front upper edge of closure 118. At such time, the "eye" of eyebolt 182, the S-shaped hook 199 and the hinge pin 194 will define an essentially-straight line. This is desirable; because it makes certain that the force, which the weight of the closure 118 applies to the portion of the tether 200, intermediate hook 199 and eyebolt 182, does not develop a moment arm which could tend to raise or lower the free end of the elongated board 140.

The function and operation of the tether-holding and tether-releasing mechanism of the fish-trapping device 198 are essentially-identical to the function and operation of the tether-holding and tether-releasing mechanism of the fish-trapping device 98. However, because the portion of tether 200, which is located between the plate 161 and the eye-bolt 182, is much closer to the vertical than is the portion of the tether 162, which is between the plate 161 and the pulley 160, the tension on the tether 200 is very much smaller than the tension on the tether 162. As a result, the frictional force between the S-hook 199 and the elongated bolt 196 is very much less than the frictional force between the S-hook 164 and the elongated bolt 156 of FIGS. 6–8. Although the tetherholding and tether-releasing mechanisms of FIG. 9 and of FIGS. 6–8 are practical and useful, the tether-holding and tether-releasing mechanism of FIG. 9 is preferred because of reduced frictional force and lower cost.

Referring particularly to FIG. 10, the numeral 204 denotes a plate which overlies part of the floor 208 of a fish-trapping device or net; and the numeral 206 denotes a plate which underlies that part of that floor. Bolts 210 extend through the plates 204 and 206 and secure them to the floor 208.

The numeral 212 denotes a bolt, pin or short rod which is held by the plate 204; and the numeral 214 denotes a tether-holding, tether-releasing member which has a helical portion that is confined by, but is rotatable relative to, that bolt. The member 214 preferably is formed from a stiff metal rod or wire which will be resistant to rust; and that member has a hook-like upper end 216, a float 218 telescoped over a horizontally extending elongated arm thereof, and barbs 220 on the outer end of that elongated arm. That float will, whenever the tether-holding and tether-releasing mechanism of FIG. 9 is immersed in water, tend to rotate the member 214 in the counterclockwise direction in FIG. 10. However bait 226, which is shown as a fish impaled on the elongated arm of that member, will be heavy enough to keep the float 218 from rotating that member in the counterclockwise direction.

The numeral 222 denotes a loop which is telescoped over the hook-like upper end 216 of the member 214; and the numeral 224 denotes a tether which extends upwardly from that hook. That tether could pass through an eye-bolt, such as the eye-bolt 182 of FIG. 9, could pass over a pulley, such as the pulley 160 in FIGS. 5 and 6, or could pass to any other appropriate part of a tether-holding and tether-releasing mechanism. The bait 226 will perform the dual functions of attracting large fish or turtles and of holding the hook-like upper end 216 of member 214 generally horizontal.

As large fish or turtles chew on the bait 226, they could rotate the member 214 far enough in the counterclockwise direction to enable the loop 222 to slip off of the hook-like upper end 216 of that member. The release of that loop and of the tether 224 would permit the fish-trapping device, of which the bottom 208 is a part, to trap the large fish or turtles. Even if the large fish or turtles did not rotate the member 214, as they chewed on the bait 226, the resulting lessening of the weight of that bait would permit the float 218 to rotate that member in the counterclockwise direction until the loop 222 and tether 224 were freed. The function and operation of the hook-like upper end 216 and of the loop 222 will be essentially the same as the function and operation of the S-hook 164 and elongated bolt 156 of FIGS. 6-8 or of S-hook 199 and elongated bolt 196 of FIG. 9.

The rotatable member 214 is inexpensive to form and it obviates the need for a bent hinge plate such as the hinge plate 146 of FIGS. 6-8 or the hinge plate 192 of FIG. 9. In addition, the member 214 obviates the need of the elongated bolt 156 or 196; and it also obviates the need of the board 140 and the feed pan 152.

Referring particularly to FIG. 11, the numeral 228 denotes a large net which has an elongated float 230 extending around the upper edge thereof. That float could be made of inherently-buoyant material such as closed-cell foam plastic, or it could be an inflatable tube. That float should be buoyant enough to tend to hold the upper edge of that net at the surface of a body of water.

The numeral 232 denotes a plate of iron or other heavy material which has ears that accommodate a bolt, pin or short rod 234. The numeral 236 denotes a tether-holding and tether-releasing member which has a helical portion that is confined by, but is rotatable relative to, that bolt. The member 236 preferably is formed from a stiff metal rod or wire which will be resistant to rust; and that member has a hook-like upper end 238 and has a feed pan 240 secured to the elongated horizontally extended arm thereof.

The feed pan 240 is made of a buoyant material, and it will tend to rise upwardly toward the surface of the body of water whenever less than a predetermined amount of feed is in that feed pan. However, that feed pan will rest on the bottom of the net 228 whenever that predetermined, or a larger, amount of feed is in that pan. Whenever that feed pan is resting on the bottom of the net 228, the hook-like upper end 238 of member 236 will be generally horizontal.

A tether 244 has a loop 242 at the lower end thereof; and the upper end of that tether is secured to a portion of the float 230. The weight of the plate 232 is great enough to enable the hook-like upper end 238 of the member 236, the loop 242 and the tether 244 to coact to hold a portion of the float 230 well below the surface of the water, as shown by FIG. 11, whenever that loop is held by that hook-like upper end. At such time, the portion of the float 230, the loop 222, and the bolt 212 will define an essentially-straight line. This is desirable; because it makes certain that the force, which the portion of the float 230 applies to the tether 224 does not develop a moment arm which could tend to raise or lower the free end of the member 214.

The space above that portion of that float will provide free access, for fish within the body of water, to the feed within the pan 240. After the fish have eaten enough of that feed, the buoyancy of that pan will cause that pan to rise upwardly, and thereby cause the member 236 to rotate in the counterclockwise direction. The consequent slipping of the loop 242 off of the hook-like upper end 238 of that member will free the portion of the float 230 which was held down by the tether 244; and, as that portion rises to the surface of the water, the net 228 will trap the fish within that net.

The tether-holding and tether-releasing member 236 is inexpensive to make and use. Specifically, that member merely requires a bolt, a heavy plate to hold that bolt, and a feed pan thereon. If desired, the feed pan 240 could be replaced by the float 218 of FIG. 10; and the free end of the elongated horizontally-extending arm of the member 236 could be provided with barbs 220. The tether-holding and tether-releasing mechanism which includes member 236, bolt 234, plate 232, loop 242, tether 244, and pan 240 or a float 218, can easily and inexpensively convert a manually-manipulatable float-equipped net into an automatically-operating fish-trapping device.

Referring particularly to FIG. 12, the numeral 240 generally denotes an enclosure which has an upper frame, lower frame, bottom, sides, top and rear that can be identical to the upper frame, lower frame, bottom, sides, top and rear of the enclosure of FIGS. 5-8. However, the enclosure 240 does not require a closure such as the closure 118 of FIGS. 5 and 8; because a feed pan 242 will serve as the closure for enclosure 240. Specifically, that feed pan is secured to an elongated board 244 which, in turn, is rotatably secured to the bottom of enclosure 240 by a board 246 and a hinge 248. That feed pan can move between the solid-line position and the dotted-line position shown by FIG. 12.

The feed pan 242 is buoyant; and it will tend to move to the dotted-line position whenever it is empty and the enclosure 240 is submerged in water. However, that feed pan can be held in the solid-line position by feed therein. As long as the feed pan 242 is in the solid-line position of FIG. 12, it will permit fish to enter the enclosure 240. However, as the fish eat the feed within that feed pan, that feed pan will start moving upwardly toward the dotted-line position, thereby gradually urging the fish to move further into the enclosure 240. When that feed pan reaches the dotted-line position, it will block the normally-open entrance of enclosure 240, and will thereby effectively prevent the escape of fish through that entrance.

The closure 118 of FIGS. 5-8, the closure 118 of FIG. 9, and the feed pan 242 of FIG. 12 are not the only closures which could be used to close the front of a fish-trapping device. For example, the "one way" closures in FIGS. 15 and 16 of my U.S. Pat. No. 3,830,004 could be used as "entrance only" closures for a fish-trapping device. Also, a number of generally-parallel spaced-apart flexible strands of rubber or the like could be used as "entrance only" closures. Those flexible strands could have one or more transversely-directed wires immediately adjacent the outer face of each of those strands. Fish could push those strands inwardly to enter an enclosure, but those fish could not push those strands outwardly to escape from that enclosure because those wires would prevent outward movement of those strands.

The "entrance only" closures for the fish-trapping device of the present invention could have many different forms. The important feature of any such closure is that it permit ready entry of fish into an enclosure but that it discourage efforts of the fish to escape from that enclosure.

The fish-trapping devices provided by the present invention can be used in a pond, lake, stream, river or any other body of water, because they do not have portions thereof extend from bank to bank or shore to shore. Also, whenever those fish-trapping devices are used in a pond, lake, stream, river or any other body of water, they can entice fish from all areas of that pond, lake, stream, river or any other body of water—and hence are not limited to the trapping of up-stream fish. As a result, the fish-trapping devices provided by the present invention are very versatile and useful.

Whereas the drawing and accompanying description have shown and described several preferred embodiments of the present invention it should be apparent to those skilled in the art that various changes may be made in the form of the invention without affecting the scope thereof.

What I claim is:

1. A self-contained device, for automatically trapping fish, which can be set in a body of water to automatically trap fish without any actuation or energy from the shore or from a ship or other floating object and which comprises an enclosure that has an opening therein through which fish can enter said enclosure when said opening is submerged in a body of water and means to hold feed within said enclosure, said means tending to rise toward the surface of said body of water but being adapted to be held against rising toward said surface of said body of water by the weight of said feed, said means responding to the eating of substantial amounts of the feed therein to start rising toward said surface of said body of water, and said device automatically, and without any actuation or energy from the shore or from a ship or other floating object, responding to said rising of said means toward said surface of said body of water to keep fish from escaping through said opening, said enclosure having a static, substantially-constant-density flotation member that rises to said surface of said body of water when all of said feed has been eaten, and said enclosure having a perforate section below the level of said flotation member, whereby oxygen-bearing water can enter said enclosure via said perforate section.

2. A device as claimed in claim 1 wherein said opening is adjacent the top of said enclosure.

3. A device as claimed in claim 1 wherein said opening is adjacent the top of said enclosure, and wherein said opening is held above said surface of said body of water when all of said feed has been eaten.

4. A device as claimed in claim 1 wherein said means is adjacent the bottom of said enclosure, and wherein said opening is adjacent the top of said enclosure.

5. A device as claimed in claim 1 wherein said static, substantially-constant-density flotation member is spaced below the level of said opening, whereby said opening is held above the level of said surface of said body of water to prevent the escape of fish therethrough whenever said static, substantially-constant-density flotation member rises to said surface of said body of water.

6. A device as claimed in claim 5 wherein said enclosure has a bottom and a side wall and an open top, and wherein said open top constitutes said opening.

7. A device as claimed in claim 1 wherein said enclosure has a perforate, form-retaining side wall, and wherein said static, substantially-constant-density flotation member is located intermediate the top and bottom of said perforate, form-retaining side wall, whereby the portion of said perforate, form-retaining side wall above said static, substantially-constant-density flotation member will prevent the escape of fish from said enclosure.

8. A device as claimed in claim 1 wherein said static, substantially-constant-density flotation member is a hollow annulus.

9. A device as claimed in claim 1 wherein said enclosure has a bottom and a side wall and an open top, wherein said side wall is perforate, and wherein said static, substantially-constant-density flotation member is a hollow annulus and is located intermediate the top and bottom of said side wall, whereby the portion of said side wall above said static, substantially-constant-density flotation member will prevent the escape of fish from said enclosure.

10. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, said means tending to rise toward the surface of said body of water but being adapted to be held against rising toward said surface of said body of water by the weight of said feed, said means responding to the eating of substantial amounts of the feed therein to start rising toward said surface of said body of water, and said device automatically, and without any actuation or energy from the shore or from a ship or other floating object, responding to said rising of said means toward said surface of said body of water to keep fish from escaping through said opening, said enclosure having a static, substantially-constant-density flotation member that rises to said surface of said body of water when all of said feed has been eaten, and a triggering means that can enable a weight to hold said enclosure below said surface of said body of water, and said triggering means responding to said rising of the first said means toward said surface of said body of water to release said weight and thereby permit said static, substantially-constant-density flotation member to rise to said surface of said body of water.

11. A self-contained device for automatically trapping fish, which can be set in a body of water to trap fish without any actuation or energy from the shore or from a ship or other floating object, and which comprises an enclosure that has an opening therein through which fish can enter said enclosure when said opening is submerged in a body of water, a closure that is movable towards and away from said opening means to hold feed within said enclosure, and a mechanical triggering means that normally helps keep said opening open for fish, the first said means automatically tending to rise toward the surface of said body of water but being adapted to be held against rising toward said surface of said body of water by the weight of said feed, said first said means responding to the eating of substantial amounts of the feed therein to start rising toward said surface of said body of water, and said triggering means automatically, and without any actuation or energy from the shore or from a ship or other floating object, responding to said rising of said first said means toward said surface of said body of water to keep fish from escaping through said opening, and an elongated flexible tether which extends between said triggering means and said closure, said triggering means normally holding said tether to enable said tether to hold said closure away from said opening, and said triggering means responding to said rising of said first said means toward said surface of said body of water to release said tether and thereby enable said tether to permit said closure to close said opening and thereby prevent the escape of fish within said enclosure.

12. A device as claimed in claim 1 wherein said opening is adjacent the top of said enclosure, and wherein a triggering means is adapted to hold at least a part of said opening below the surface of said body of water but is adapted to respond to rising of the first said means toward said surface of said body of water to permit said part of said opening at the top of to rise to said surface of said body of water to dispose said opening above said surface of said body of water.

13. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, and a triggering means that normally helps keep said opening open for fish, the first said means tending to rise toward the surface of said body of water but being adapted to be held against rising toward said surface of said body of water by the weight of said feed, said first said means responding to the eating of substantial amounts of the feed therein to start rising toward said surface of said body of water, said triggering means automatically, and without any actuation or energy from the shore or from a ship or other floating object, responding to said rising of said first said means toward said surface of said body of water to keep fish from escaping through said opening, said enclosure having a static, substantially-constant-density flotation member that rises to said surface of said body of water when all of said feed has been eaten, said triggering means enabling a weight to hold said enclosure below said surface of said body of water, and said triggering means responding to said rising of said first said means toward said surface of said body of water to release said weight and thereby permit said static, substantially-constant-density flotation member to rise to said surface of said body of water.

14. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, said means tending to rise toward the surface of said body of water but being adapted to be held against rising toward said surface of said body of water by the weight of said feed, said means responding to the eating of substantial amounts of feed therein to start rising toward said surface of said body of water, said enclosure being heavier than the water it displaces, whereby said enclosure will tend to remain below said surface of said body of water even when all of said feed has been eaten, static, substantially-constant-density flotation means tending to remain at said surface of said body of water, supporting means that extend between said static, substantially-constant-density flotation means and said enclosure to hold said enclosure a predetermined distance below said surface of said body of water, a closure which is movable toward and away from said opening, and a mechanical triggering means that normally holds said closure away from said opening, said triggering means automatically, and without any actuation or energy from the shore or from a ship or other floating object, responding to said rising of said first said means toward said surface of said body of water to permit said closure to close said opening and thereby keep fish from escaping through said opening, said static, substantially-constant-density flotation means helping to indicate the location of said self-contained device in said body of water.

15. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, and a triggering means that normally helps keep said opening open for fish, the first said means tending to rise toward the surface of said body of water but being adapted to be held against rising toward said surface of said body of water by the weight of said feed, said first said means responding to the eating of substantial amounts of the feed therein to start rising toward said surface of said body of water, and said triggering means automatically, and without any actuation or energy from the shore or from a ship or other floating object, responding to said rising of said first said means toward said surface of said body of water to keep fish from escaping through said opening, a closure that is movable toward and away from said opening, said triggering means normally holding a tether to enable said tether to hold said closure away from said opening, and said triggering means responding to said rising of said first said means toward said surface of said body of water to release said tether and thereby enable said tether to permit said closure to close said opening.

16. A self-contained device, for automatically trapping fish which can be set in a body of water to trap fish without any actuation or energy from the shore or from a ship or other floating object and which comprises an enclusre that has an opening therein through which fish can enter said enclosure when said opening is submerged in a body of water, means to hold feed within said enclosure, and a triggering means that normally helps keep said opening open for fish, the first said means tending to rise toward the surface of said body of water but being adapted to be held against rising toward said surface of said body of water by the weight of said feed, said first said means responding to the eating of substantial amounts of the feed therein to start rising toward said surface of said body of water, and said triggering means automatically, and without any actuation or energy from the shore or from a ship or other floating object, responding to said rising of said first said means toward said surface of said body of water to keep fish from escaping through said opening, a closure that is movable toward and away from said opening, a tether that is attached to said closure and to said triggering means, a pulley that accommodates a portion of said tether which is intermediate the point of attachment of said tether to said closure and the point of attachment of said tether to said triggering means, said triggering means and said pulley and said tether normally coacting to hold said closure away from said opening, and said triggering means responding to said rising of said first said means toward said surface of said body of water to release said tether and thereby enable said tether to move relative to said pulley to permit said closure to close said opening.

17. A self-contained device, for automatically trapping fish, which can be set in a body of water to trap fish without any actuation or energy from the shore or from a ship or other floating object and which comprises an enclosure that has an opening therein through which fish can enter said enclusure when said opening is submerged in a body of water, means to hold feed within said enclosure, and a triggering means that normally helps keep said opening open for fish, the first said means tending to rise toward the surface of said body of water but being adapted to be held against rising toward said surface of said body of water by the weight of said feed, said first said means responding to the eating of substantial amounts of the feed therein to start rising toward said surface of said body of water, and said triggering means automatically, and without any actuation or energy from the shore or from a ship or other floating object, responding to said rising of said first said means toward said surface of said body of water to keep fish from escaping through said opening, a closure that is movable toward and away from said opening, a pivot that holds one end of said first said means to permit said rising of said first said means toward said surface of said body of water to rotate said first said means about said pivot, a tether that is attached to said closure and to said triggering means, a pulley that accommodates a portion of said tether which is intermediate said closure and the point of attachment of said tether to said triggering means, said triggering means and said pulley and said tether normally coacting to hold said closure away from said opening, said triggering means responding to said rising of said first said means toward said surface of said body of water to release said tether and thereby enable said tether to permit said closure to close said opening, and one face of said pulley and said point of attachment of said tether to said triggering means and said pivot coacting to define an essentially straight line whenever said triggering means and said pulley and said tether coact to hold said closure.

18. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, said means tending to rise toward the surface of said body of water but being adapted to be held against rising toward said surface of said body of water by the weight of said feed, said means responding to the eating of substantial amounts of the feed therein to start rising toward said surface of said body of water, a static, substantially-constant-density flotation member that tends to rise to said surface of said body of water when all of said feed has been eaten, said device automatically, and without any actuation or energy from the shore or from a ship or other floating object, responding to said static, substantially-constant-density flotation member and to said rising of said means toward said surface of said body of water to keep fish from escaping through said opening, said static, substantially-constant-density flotation member being spaced below the level of said opening, whereby said opening is held above the level of said surface of said body of water to prevent the escape of fish therethrough whenever said static, substantially-constant-density flotation member rises to said surface of said body of water, and said enclosure having a perforate section below the level of said static, substantially-constant-density flotation member, whereby oxygen-bearing water can enter said enclosure via said perforate section to supply oxygen to fish held within said enclosure.

19. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, said means tending to rise toward the surface of said body of water but being adapted to be held against rising toward said surface of said body of water by the weight of said feed, said means responding to the eating of substantial amounts of the feed therein to start rising toward said surface of said body of water, a static, substantially-constant-density flotation member that tends to rise to said surface of said body of water when all of said feed has been eaten, said device automatically, and without any actuation or energy from the shore or from a ship or other floating object, responding to said static, substantially-constant-density flotation member and to said rising of said means toward said surface of said body of water to keep fish from escaping through said opening, said static, substantially-constant-density flotation member being a hollow annulus, said enclosure having a perforate form-retaining side wall, and said static, substantially-constant-density flotation member being located intermediate the top and bottom of said perforate, form-retaining side wall, whereby oxygen-bearing water can enter said enclosure via the portion of said perforate, form-retaining side wall between said static, substantially-constant-density flotation member and whereby the portion of said perforate, form retaining side wall above said static, substantially-constant-density flotation member will prevent the escape of fish from said enclosure.

20. A self-contained device, for automatically trapping fish, which can be set in a body of water to trap fish without any actuation or energy from the shore or from a ship or other floating object and which comprises an enclosure that has an opening therein through which fish can enter said enclosure when said opening is submerged in a body of water, means to hold feed within said enclosure, said means tending to rise toward the surface of said body of water but being adapted to be held against rising toward said surface of said body of water by the weight of said feed, said means responding to the eating of substantial amounts of the feed therein to start rising toward said surface of said body of water, said enclosure being heavier than the water it displaces, whereby said enclosure will tend to remain below said surface of said body of water even when all of said feed has been eaten, a static, substantially-constant-density flotation means tending to remain at said surface of said body of water, cords that extend between said static, substantially-constant-density flotation means and said enclosure to hold said enclosure a predetermined distance below said surface of said body of water, a closure which is movable toward and away from said opening, and a mechanical triggering means that normally holds said closure away from said opening, said triggering means automatically, and without any actuation or energy from the shore or from a ship or other floating object, responding to said rising of said means toward said surface of said body of water to permit said closure to close said opening and thereby keep fish from escaping through said opening.

21. A self-contained device, for automatically trapping fish, which can be set in a body of water to trap fish without any actuation or energy from the shore or from a ship or other floating object and which comprises an enclosure with a portion that is disposable in one position to permit fish to enter said enclosure and that is disposable in a second position to keep fish within said enclosure, a tether-holding and tether-releasing mechanism which includes a member that is disposable in a tether-holding position and that also is disposable in a tether-releasing position and which also includes a means to hold feed within said enclosure and that tends to rise toward the surface of said body of water but is adapted to be held against rising toward said surface of said body of water by the weight of said feed, and a tether which extends between said portion of said enclosure and said tether-holding and tether-releasing mechanism, said tether-holding and tether-releasing mechanism being adapted to coact with said tether to hold said portion of said closure in said one position to cuase said one portion to permit fish to enter said enclosure, said tether-holding and tether-releasing mechanism being adapted to respond to rising of said feed-holding means toward said surface of said body of water to release said tether and thereby permit said portion of said enclosure to move to said second position to keep fish within said enclosure, said enclosure being a float-equipped net, and said portion of said enclosure being a part of the upper edge of said float-equipped net.

22. A self-contained device as claimed in claim 21 wherein said feed-holding means and said tether-holding member are connected to rotate together, and wherein said feed-holding means causes said tether-holding member to rotate to release said tether as said feed-holding means rises toward said surface of said body of water.

23. A self-contained device, for automatically trapping fish, which can be set in a body of water to trap fish without any actuation or energy from the shore or from a ship or other floating object and which comprises an enclosure with a portion that is disposable in one position to permit fish to enter said enclosure and that is disposable in a second position to keep fish within said enclosure, a tether-holding and tether-releasing mechanism which includes a member that is disposable in a tether-holding position and that also is disposable in a tether-releasing position, and a tether which extends between said portion of said enclosure and said tether-holding and tether-releasing mechanism, said tether-holding and tether-releasing mechanism being adapted to coact with said tether to hold said portion of said enclosure in said one position to cause said one portion to permit fish to enter said enclosure, said tether-holding and tether-releasing mechanism being adapted to respond to striking action by an aquatic creature to release said tether and thereby permit said portion of said enclosure to move to said second position to keep fish within said enclosure, said enclosure being a float-equipped net, and said portion of said enclosure being a part of the upper edge of said float-equipped net.

24. A device as claimed in claim 1 wherein said means is a feed pan which physically blocks said entrance when it rises toward said surface of said body of water.

25. A self-contained device, for automatically trapping fish which, can be set in a body of water to trap fish without any actuation or energy from the shore or from a ship or other floating object and which comprises an enclosure that has an opening therein through which fish can enter said enclosure when said opening is submerged in a body of water and means to hold feed within said enclosure, said means tending to rise toward the surface of said body of water but being adapted to be held against rising toward said surface of said body of water by the weight of said feed, said means responding to the eating of substantial amounts of the feed therein to start rising toward said surface of said body of water, and said device automatically, and without any actuation or energy from the shore or from a ship or other floating object, responding to said rising of said means toward said surface of said body of water to keep fish from escaping through said opening, said enclosure having a normally-open entrance, and said means rotating upwardly and inwardly relative to said enclosure to physically block said entrance when said means rises toward said surface of said body of water.

26. A self-contained device as claimed in claim 15 wherein said closure is an openable top for said enclosure which has a downwardly-depending portion that substantially closes said opening whenever said closure is moved toward said opening.

27. A self-contained device as claimed in claim 15 wherein said enclosure has a bottom and upstanding sides with an opening in one side thereof, and wherein said closure serves as the top for said enclosure and has a portion which closes said opening in said one side of said enclosure whenever said closure is moved toward said opening.

28. A self-contained device as claimed in claim 15 wherein said first said means and said triggering means are connected to rotate together about an axis of rotation, and wherein said triggering means is closer to said axis of rotation than is said first said means.

* * * * *